(12) United States Patent
Takeda (10) Patent No.: US 7,247,108 B2
(45) Date of Patent: Jul. 24, 2007

(54) METHOD AND APPARATUS FOR CONTROLLING AN AUTOMATIC BICYCLE TRANSMISSION

(75) Inventor: Kazuhiro Takeda, Sakai (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 975 days.

(21) Appl. No.: 10/145,933

(22) Filed: May 14, 2002

(65) Prior Publication Data

US 2003/0216201 A1    Nov. 20, 2003

(51) Int. Cl.
    *F16H 61/00*    (2006.01)
(52) U.S. Cl. ....................................... 474/70
(58) Field of Classification Search ............. 474/69, 474/70, 78, 81; 74/335; 701/55, 56, 64; 280/260

See application file for complete search history.

(56) References Cited

U.S. PATENT DOCUMENTS

| 4,412,828 | A | * | 11/1983 | Darby ...................... 474/81 |
| 4,490,127 | A | | 12/1984 | Matsumoto et al. |
| 5,261,858 | A | | 11/1993 | Browning |
| 5,266,065 | A | * | 11/1993 | Ancarani Restelli ......... 474/78 |
| 5,569,104 | A | * | 10/1996 | Bellio et al. .................. 474/70 |
| 5,728,017 | A | | 3/1998 | Bellio et al. |
| 5,865,454 | A | * | 2/1999 | Campagnolo ............... 280/238 |
| 6,047,230 | A | * | 4/2000 | Spencer et al. ............... 701/57 |
| 6,132,327 | A | * | 10/2000 | Campagnolo ................. 474/80 |
| 6,146,297 | A | * | 11/2000 | Kimura ....................... 474/78 |
| 6,467,786 | B2 | * | 10/2002 | Horiuchi .................... 280/260 |
| 6,490,507 | B1 | * | 12/2002 | Campagnolo .................. 701/1 |
| 6,537,173 | B2 | * | 3/2003 | Mercat et al. ............. 475/212 |

* cited by examiner

Primary Examiner—Vicky A. Johnson
(74) Attorney, Agent, or Firm—James A. Deland (57) ABSTRACT

An apparatus for determining when to shift a bicycle chain from a first sprocket having a first number of teeth to a second sprocket having a second number of teeth comprises a memory for storing a reference value, and a processor that determines a shift value corresponding to a shift speed for shifting the chain from the first sprocket to the second sprocket by multiplying the reference value by one of the first number of teeth and the second number of teeth and dividing by the other one of the first number of teeth and the second number of teeth.

42 Claims, 6 Drawing Sheets

METHOD AND APPARATUS FOR CONTROLLING AN AUTOMATIC BICYCLE TRANSMISSION

BACKGROUND OF THE INVENTION

The present invention is directed to bicycles and, more particularly, to a method and apparatus for controlling an automatic bicycle transmission.

A typical bicycle transmission may include a plurality of front sprockets that rotate with the pedal cranks, a plurality of rear sprockets that rotate with the rear wheel, and a chain that engages one of the front sprockets and one of the rear sprockets. A front derailleur may be mounted to the bicycle frame for shifting the chain among the plurality of front sprockets, and a rear derailleur may be mounted to the bicycle frame for shifting the chain among the plurality of rear sprockets. Manually operated switches or levers may control the front and rear derailleurs. Some modem bicycles use small electric motors to control the bicycle transmission. The motors may be controlled manually by the foregoing switches or levers, or automatically based on bicycle speed and/or cadence.

A number of automatically controlled bicycle transmissions have been designed. For example, U.S. Pat. No. 4,490,127 issued to Matsumoto discloses one type of automatically controlled bicycle transmission. In that system, a wheel speed sensor (comprising a magnet mounted to the wheel and a magnetic sensor mounted to the frame) is used to determine wheel speed (RPM), and a pedal crank rotation sensor (comprising a magnet mounted to the pedal cranks and a magnetic sensor mounted to the frame) is used to determine pedal crank cadence (RPM). A rear derailleur is operated to shift gears based either on bicycle speed or pedal crank cadence. When the derailleur is operated to shift gears based on bicycle speed, upper and lower wheel speed limits are calculated using the equations $V(upper)=aX$ and $V(lower)=a(X-1)-b$. In these equations, X is the number of the sprocket engaged, and a and b are values determined empirically and set by switches on the computer console. When the derailleur is operated to shift gears based on cadence, single upper and lower cadence limits are set for all gears.

U.S. Pat. No. 5,261,858 issued to Browning discloses an automatically controlled bicycle transmission for controlling the operation of both front and rear derailleurs. In this system, a table is prepared listing the gear ratios for various combinations of front and rear derailleur positions, and a wheel speed that produces a desired cadence is set for each gear ratio. The table is sorted from lowest to highest gear ratio, and the front and rear derailleurs are operated to move from lower to higher gear ratios (or vice versa) to maintain a desired cadence. The shift points are set to halfway between the desired wheel speeds for adjacent gear ratios.

U.S. Pat. No. 5,728,017 issued to Bellio, et al also discloses an automatically controlled bicycle transmission for controlling the operation of both front and rear derailleurs. In this system, a wheel speed sensor is used to determine wheel speed, and a pedal crank rotation sensor is used to determine pedal crank cadence. The rider enters a calibration mode and rides the bicycle in each front and rear derailleur combination. The system then calculates a gear ratio for each combination of front and rear derailleur positions using the formula Gear Ratio=Wheel RPM/Cadence. The resulting gear ratios are sorted from numerically lowest to numerically highest and stored together with their corresponding front and rear derailleur positions in a memory. The rider also specifies low and high cadence limits. During automatic operation of the bicycle, the system calculates a theoretical cadence from the wheel speed and current gear ratio. The front and rear derailleurs are operated to upshift when the theoretical cadence is too low, and the front and rear derailleurs are operated to downshift when the theoretical cadence is too high.

In U.S. Pat. No. 4,490,127, the wheel speed at which derailleur shifting occurs is calculated in a somewhat complicated and arbitrary manner, and the calculations do not seem to take into account the actual sprocket sizes used on the bicycle. In both U.S. Pat. No. 5,261,858 and 5,728,017, both front and rear derailleurs may have to be operated to shift a single step, and complicated calculations must be made to operate the system based on a desired cadence. This is especially true of the system disclosed in U.S. Pat. No. 5,728,017, which requires the rider to pedal the bicycle to obtain actual cadence values to set cadence limits, and then the computer calculates theoretical cadence values (using gear ratios and current wheel speeds) that are compared to the previously set cadence limits.

SUMMARY OF THE INVENTION

The present invention is directed to a method and apparatus for controlling the operation of an automatic bicycle transmission that is much simpler than prior art systems. Shift points are determined simply by wheel speed and the tooth ratio between adjacent sprockets, and shifting is determined during operation by wheel speed alone. Thus, the present invention implements an automatically controlled bicycle transmission without the complicated methods of the prior art systems.

In one embodiment of the present invention, an apparatus for determining when to shift a bicycle chain from a first sprocket having a first number of teeth to a second sprocket having a second number of teeth comprises a memory for storing a reference value, and a processor that determines a shift value corresponding to a shift speed for shifting the chain from the first sprocket to the second sprocket by multiplying the reference value by one of the first number of teeth and the second number of teeth and dividing by the other one of the first number of teeth and the second number of teeth. If desired, the shift points so determined may be further adjusted to take into account other factors such as varied terrain, the ability of the rider, and so on.

DETAILED DESCRIPTION OF THE EMBODIMENTS

Figure 1:
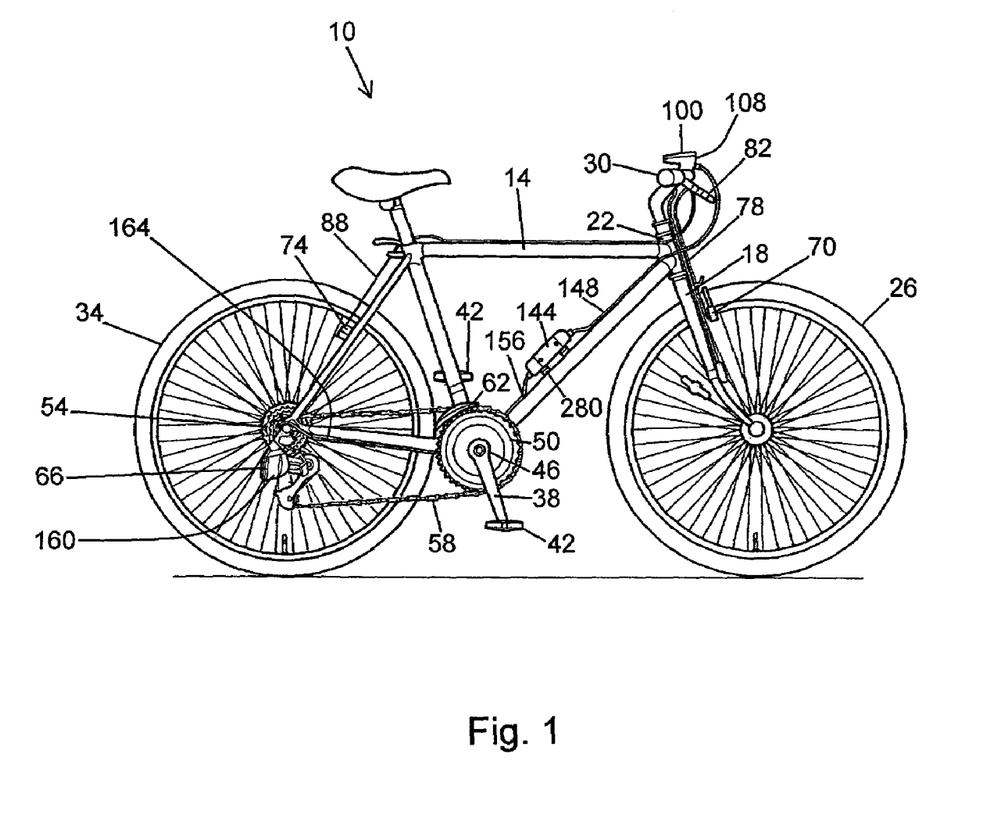
FIG. 1 is a side view of a bicycle that includes a particular embodiment of an automatic bicycle transmission according to the present invention.

FIG. 1 is a side view of a bicycle 10 that includes a particular embodiment of an automatic bicycle transmission 12 (FIG. 3) according to the present invention. Bicycle 10 has a frame 14, a front fork 18 rotatably supported in a head tube 22 of frame 14, a front wheel 26 rotatably supported by fork 18, a handlebar 30 for rotating fork 18 (and hence front wheel 26) in the desired direction, and a rear wheel 34 rotatably supported at the rear of frame 14. A pair of crank arms 38, each supporting a pedal 42, are mounted to an axle 46 that is rotatably supported in a lower portion of frame 14. A plurality of, e.g., three front sprockets 50 are mounted to the right side crank arm 38 for rotating with the right side crank arm 38, and a plurality of, e.g., eight rear sprockets 54 are mounted to the rear wheel 34 for rotating with rear wheel 34. A chain 58 engages one of the front sprockets 50 and one of the rear sprockets 54. A front derailleur 62 is mounted to frame 14 in close proximity to the plurality of front sprockets 50 for moving chain 58 among the plurality of front sprockets 50, and a rear derailleur 66 is mounted to frame 14 in close proximity to the plurality of rear sprockets 54 for moving chain 58 among the plurality of rear sprockets 54. A front braking unit 70 is mounted to fork 18 for braking front wheel 26, and a rear braking unit 74 is mounted to the rear of frame 14 for braking rear wheel 34. Front braking unit 70 is connected to a Bowden-type control cable 78 that is connected to a brake lever assembly 82 mounted on the right side of handlebar 30. Similarly, rear braking unit 74 is connected to a Bowden-type control cable 88 that is connected to a brake lever assembly 92 (FIG. 2) mounted on the left side of handlebar 30.

Figure 2:
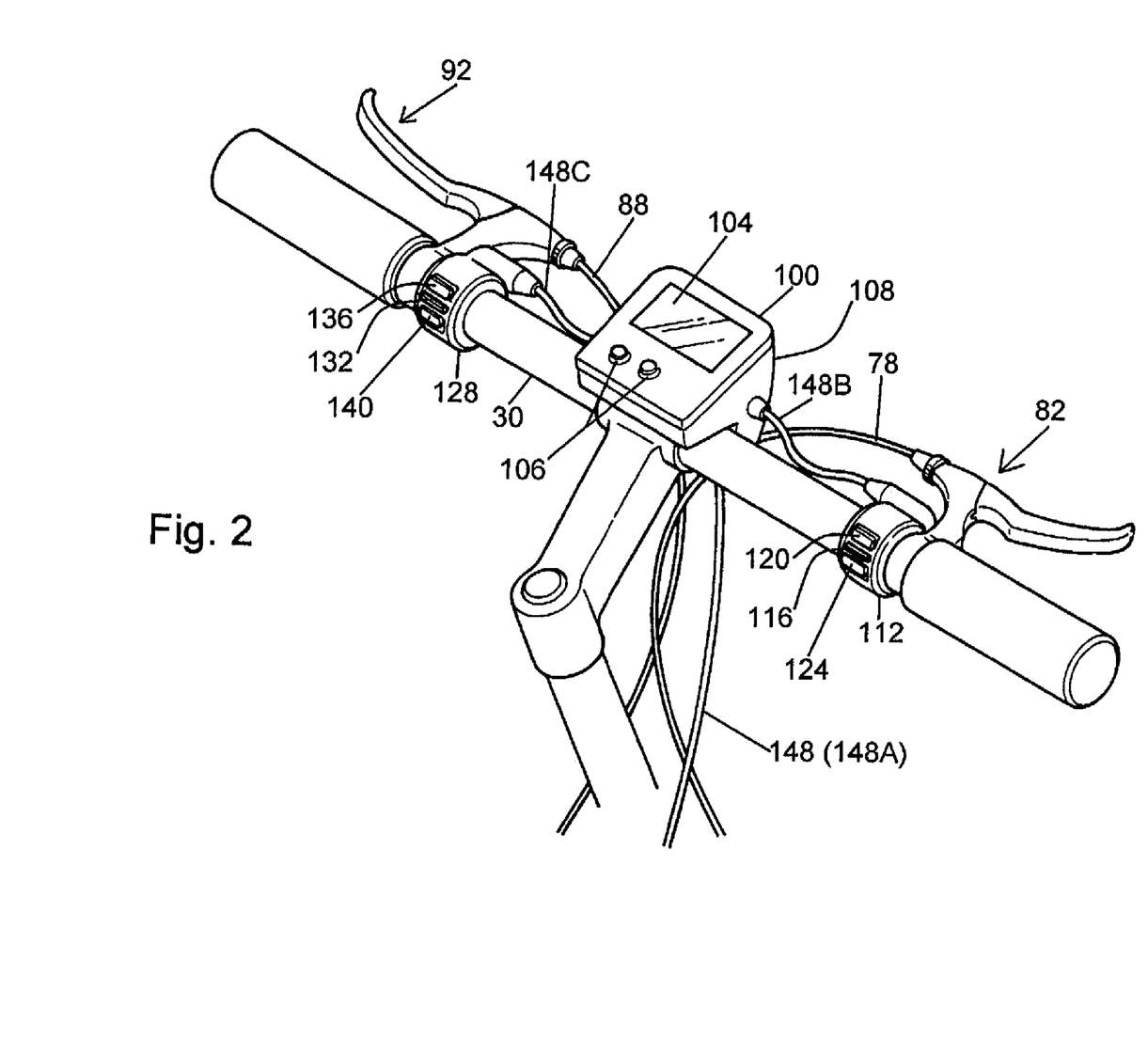
FIG. 2 is an oblique view of a particular embodiment of the handlebar mounted components of the automatic bicycle transmission shown in FIG. 1.

As shown in FIGS. 1 and 2, a display housing 100 having an LCD display 104 and mode switches 106 is coupled to a mounting bracket 108 attached to handlebar 30. Display 104 typically displays information to the rider such as riding speed, cadence, which sprockets are engaged by chain 58, and so on. A right switch housing 112 containing a mode switch 116, a rear derailleur upshift switch 120 and a rear derailleur downshift switch 124 is mounted to the right side of handlebar 30, and a left switch housing 128 containing a mode switch 132, a front derailleur upshift switch 136 and a front derailleur downshift switch 140 is mounted to the left side of handlebar 30. A derailleur control housing 144 is mounted to frame 14, and it is electrically coupled to display housing 100 through an intermediate communication path 148A, to right switch housing 112 through a communication path 148B, and to left switch housing 128 through a communication path 148C. Communication paths 148A, 148B and 148C together comprise a communication path 148.

Figure 3:
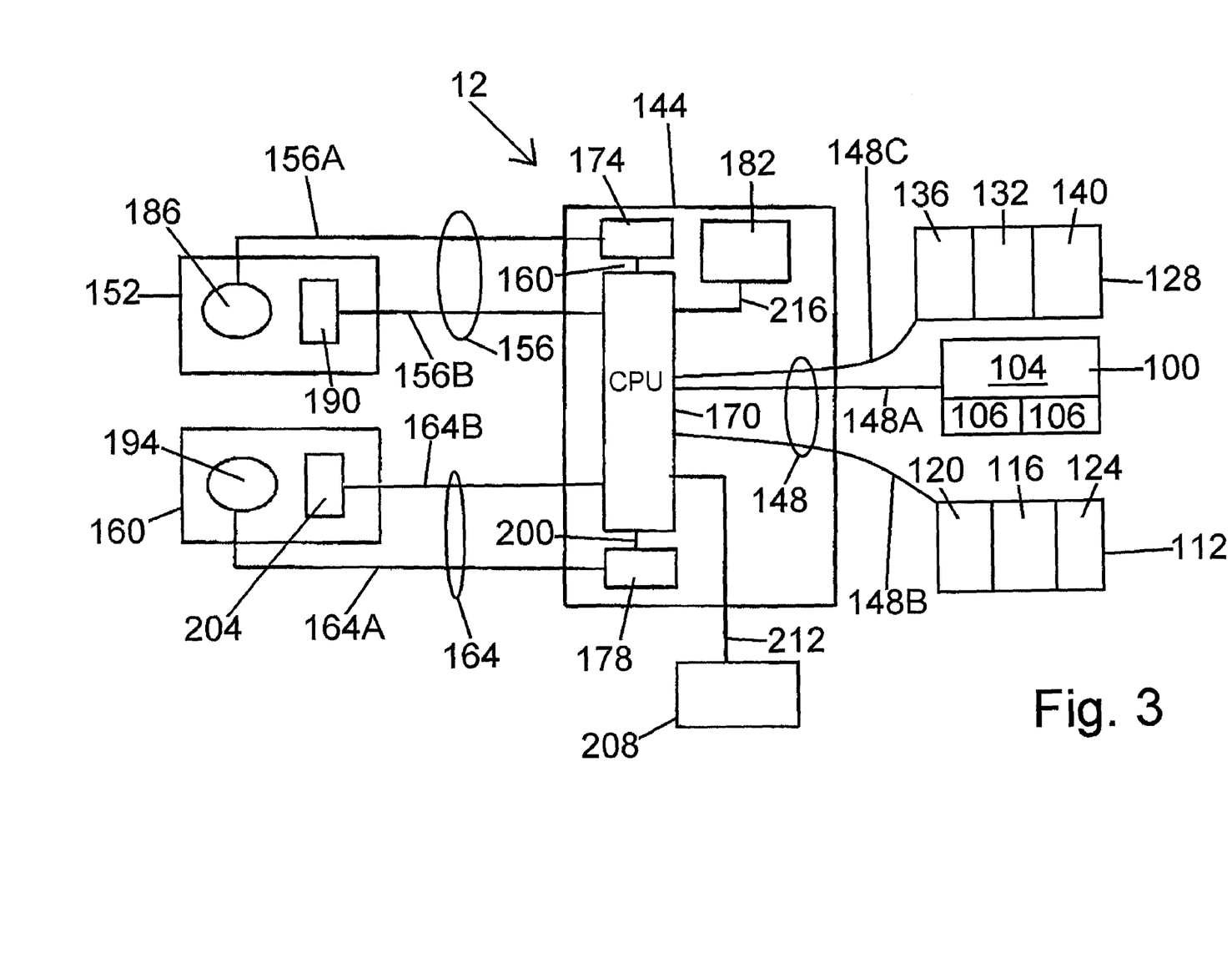
FIG. 3 is a block diagram of a particular embodiment of the automatic bicycle transmission shown in FIG. 1.

FIG. 3 is a block diagram of a particular embodiment of the circuit components used in apparatus 12. A front derailleur motor unit 152 operates front derailleur 62, and it is electrically coupled to derailleur control housing 144 through an intermediate communication path 156. A rear derailleur motor unit 160 operates rear derailleur 66, and it is electrically coupled to derailleur control housing 144 through an intermediate communication path 164. Derailleur control housing 144 includes processor 170, a motor driver 174 which functions as a motion control circuit for front derailleur 62, a motor driver 178 which functions as a motion control circuit for rear derailleur 66, and a memory 182. Motor driver 174 communicates with a motor 186 associated with front derailleur 62 through a communication path 156A, and with processor 170 through a communication path 160. Processor 170 communicates with a position detecting potentiometer 190 associated with front derailleur 62 through a communication path 156B. Communication paths 156A and 156B together form communication path 156. Similarly, motor driver 178 communicates with a motor 194 associated with rear derailleur 66 through a communication path 164A, and with processor 170 through a communication path 200. Processor 170 communicates with a position detecting potentiometer 204 through a communication path 164B. Communication paths 164A and 164B together form communication path 164. Processor 170 receives operating power from a conventional hub dynamo 208 through a communication path 212.

Memory 182 communicates with processor 170 through a communication path 216, and it is used to store programming for processor 170 as well as other information (discussed below) used to control the operation of front derailleur 62 and rear derailleur 66. As readily recognized by one of ordinary skill in the art, memory 182 could be static or dynamic, volatile or nonvolatile, individual registers loaded during the operation of the device, or any software or hardware, temporary or permanent storage technique. In other words, the values stored in memory 182 could be predetermined or calculated in real time (in which case memory 182 may consist of a register in the program).

In this embodiment, there are three sprockets 50 and eight rear sprockets 54 as shown in Table 1.

TABLE 1

| | SPROCKET | TEETH |
|---|---|---|
| FRONT | OUTER | 46 |
| | MIDDLE | 34 |
| | INNER | 24 |
| REAR | 1 | 33 |
| | 2 | 29 |
| | 3 | 25 |
| | 4 | 21 |
| | 5 | 17 |
| | 6 | 15 |
| | 7 | 13 |
| | 8 | 11 |

Memory 182 typically stores a reference value that is used for calculating shift points for front derailleur 62 and rear derailleur 66. Typically, this value corresponds to a wheel speed for shifting from one sprocket to another. The reference value may be stored by the manufacturer or entered by the rider. A benefit of the present invention is that any two sprockets may be selected for this purpose. After the reference value is selected, the shift points for other sprockets may be calculated very easily. In general, according to the present invention, when shifting chain 58 from a first sprocket having a first number of teeth to a second sprocket having a second number of teeth, the processor determines a shift value corresponding to a shift speed for shifting the chain from the first sprocket to the second sprocket by multiplying the reference value by one of the first number of teeth and the second number of teeth and dividing by the other one of the first number of teeth and the second number of teeth. Which numbers are used for multiplication and division depends on whether shifting is made by the front derailleur or the rear derailleur, and whether an upshift or a downshift is desired. When upshifting chain 58 from a first rear sprocket 54 (having a first number of teeth) to a second rear sprocket 54 (having a second number of teeth), processor 170 multiplies the reference value by the second number of teeth and divides by the first number of teeth. For example, assume chain 58 engages the inner front sprocket 50 and the first rear sprocket 54, and that a reference value of 863 milliseconds is chosen for the pulse interval from the wheel sensor indicating a desired wheel speed for upshifting from the first rear sprocket 54 to the second rear sprocket 54. The shift value for upshifting from the second rear sprocket 54 (which has 29 teeth) to the third rear sprocket 54 (which has 25 teeth) is calculated as (863)×(25/29), or 744 milliseconds. This value becomes the reference value for determining the shift value for upshifting from the third rear sprocket to the fourth rear sprocket, and so on. The result for each sprocket is shown in Table 2.

TABLE 2

| REAR SPROCKET | PULSE INTERVAL (mSEC) |
|---|---|
| 1 | 863 |
| 2 | 744 |
| 3 | 625 |
| 4 | 506 |
| 5 | 446 |
| 6 | 387 |
| 7 | 327 |
| 8 | XXX |

In this embodiment, the values calculated for upshifting to a particular sprocket also can be used for downshifting to that same sprocket. For example, the value calculated for upshifting from the second sprocket to the third sprocket also can be used for downshifting from the fourth sprocket to the third sprocket. A downshift table similar to Table 2 can be prepared very easily by shifting the values in Table 2 by two sprocket positions. The result is the same as if each value were calculated with the general equation noted above. More specifically, when downshifting chain 58 from a first rear sprocket 54 (having a first number of teeth) to a second rear sprocket 54 (having a second number of teeth), processor 170 multiplies the reference value by the second number of teeth and divides by the first number of teeth. The shift value for downshifting from the 29-tooth rear sprocket 54 (the first rear sprocket) to the 33-tooth rear sprocket 54 (the second rear sprocket) can be calculated as (863)×(33/29) or 982 milliseconds. The result for each sprocket is shown in Table 3.

TABLE 3

| REAR SPROCKET | PULSE INTERVAL (mSEC) |
|---|---|
| 1 | XXX |
| 2 | 982 |
| 3 | 863 |
| 4 | 744 |
| 5 | 625 |
| 6 | 506 |
| 7 | 446 |
| 8 | 387 |

If desired, another initial reference value can be determined empirically when chain 58 engages the middle front sprocket 50 (with the shift points for each rear sprocket 54 calculated accordingly), and yet another initial reference value can be determined empirically when chain 58 engages the outer front sprocket 50 (with the shift points for each rear sprocket 54 calculated accordingly). However, in this embodiment, the initial reference value used when chain 58 engages the middle front sprocket 50 is determined using the initial reference value used when chain 58 engages the inner front sprocket 50 and the ratio of teeth on the inner and middle front sprockets 50. More specifically, in this embodiment the initial reference value when chain 58 engages the middle front sprocket 50 is determined by multiplying the initial reference value when chain engages the inner front sprocket 50 by the number of teeth on the inner front sprocket 50 and dividing by the number of teeth on the middle front sprocket 50. Thus, in this embodiment the initial reference value when chain 58 engages the middle front sprocket can be calculated as (863)×(24/34), or 609 milliseconds. The remaining upshift and downshift points for rear derailleur 66 can be calculated using the same method noted above to produce the values listed in Table 4. The values in Table 4 also could be calculated very easily by multiplying each pulse interval in Tables 2 and 3 by the number of teeth on the inner front sprocket 50 and dividing by the number of teeth on the middle front sprocket 50.

TABLE 4

| REAR SPROCKET | UPSHIFT PULSE INTERVAL (mSEC) | DOWNSHIFT PULSE INTERVAL (mSEC) |
|---|---|---|
| 1 | 609 | XXX |
| 2 | 525 | 693 |
| 3 | 441 | 609 |
| 4 | 357 | 525 |
| 5 | 315 | 441 |
| 6 | 273 | 357 |
| 7 | 231 | 315 |
| 8 | XXX | 273 |

The same procedure can be used to determine the pulse intervals when chain 58 engages the outer front sprocket 50 as shown in Table 5. In this case each value in Table 5 can be calculated simply by multiplying each value in Table 4 by the number of teeth on the middle front sprocket 50 (34 teeth) and dividing by the number of teeth on the outer front sprocket 50 (46 teeth).

TABLE 5

| GEAR POSITION | UPSHIFT PULSE INTERVAL (mSEC) | DOWNSHIFT PULSE INTERVAL (mSEC) |
|---|---|---|
| 1 | 450 | XXX |
| 2 | 388 | 512 |
| 3 | 326 | 450 |
| 4 | 264 | 388 |
| 5 | 233 | 326 |
| 6 | 202 | 264 |
| 7 | 171 | 233 |
| 8 | XXX | 202 |

The foregoing shift values can be calculated in real time for each gear, or memory 182 could store one or more tables corresponding to Tables 2-5. In the latter case, memory 182 stores one or more tables, each table having a plurality of shift values corresponding to shift speeds, wherein a shift value $SV(m)$ for shifting from a sprocket $S(m)$ having $T(m)$ teeth to a sprocket $S(n)$ having $T(n)$ teeth equals a reference value $RV(m)$ multiplied by one of $T(m)$ and $T(n)$ and divided by the other one of $T(m)$ and $T(n)$ using the methods noted above, wherein the reference value $RV(m)$ corresponds to a shift value $SV(p)$ for shifting the chain from a previous sprocket $S(p)$ to sprocket $S(m)$. Processor 170 provides a shift signal when the bicycle chain engages sprocket $S(m)$ and a value calculated from the wheel rotation sensor passes shift value $SV(m)$.

Figure 4:
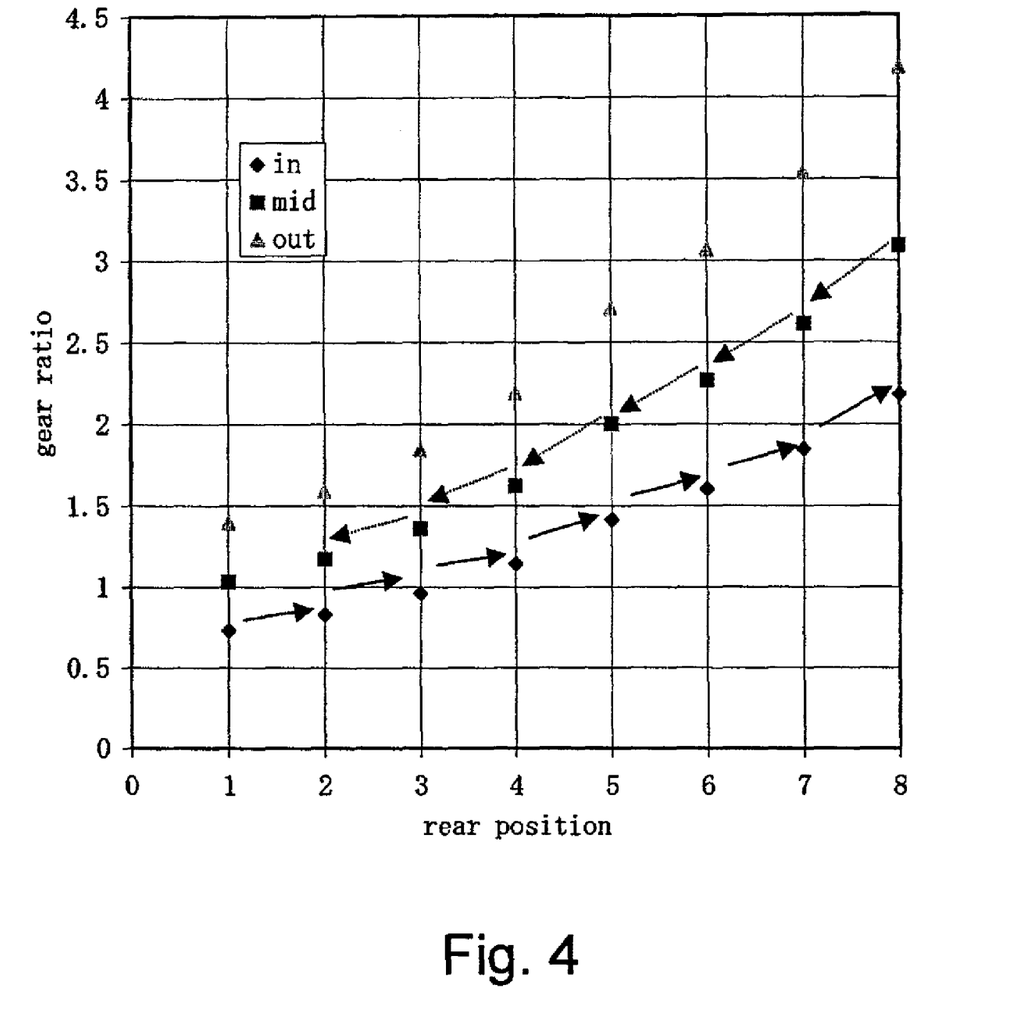
FIG. 4 is a chart illustrating rear derailleur shifting according to the present invention.

The operation of a system constructed according to the teachings of the present invention is shown in FIG. 4. The manner of shifting according to the present invention is very different from and much simpler than prior art systems that control both front and rear derailleurs. For example, in the systems disclosed in U.S. Pat. Nos. 5,261,858 and 5,728,017, it is necessary to sort every possible gear ratio and control the front and rear derailleurs in a complicated manner to shift sequentially among the gear ratios. This frequently requires the operation of both front and rear derailleurs in a single shift step. The system disclosed in U.S. Pat. No. 5,261,858 also requires a determination of whether the operation of either the front or rear derailleur in such a dual-operation shift would cause the bicycle transmission to be temporarily in a gear ration outside the range between the original and destination gear ratios. Such a shift is prohibited, and the computer must select another gear. By contrast, a system constructed according to the present invention moves only one derailleur for each step as shown in FIG. 4, and all shifting is performed simply by comparing the pulse intervals indicating wheel speed to the set shift values. It is not necessary to calculate cadence, either actually or theoretically, for each shift point, even though the present system also produces acceptable cadence ranges for each gear.

Figure 5:
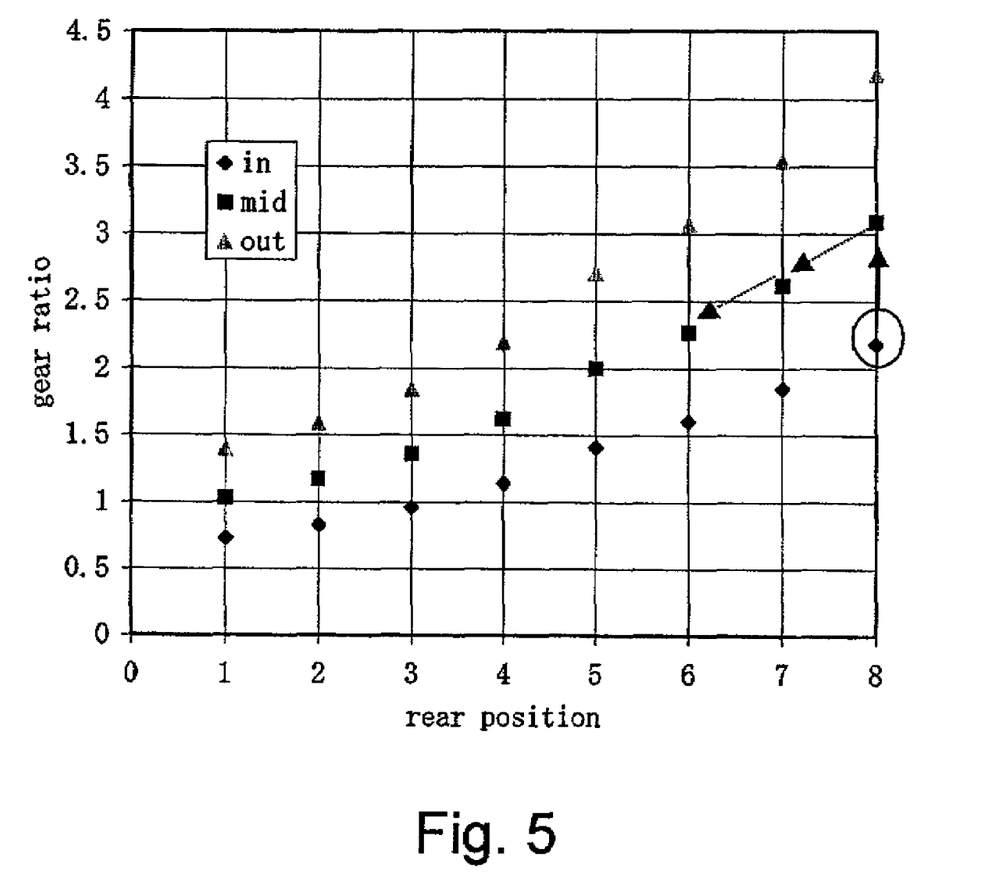
FIG. 5 is a chart illustrating derailleur shifting according to the present invention when the rear derailleur is at an end sprocket.

If the bicycle is still accelerating when rear derailleur 66 reaches the smallest rear sprocket 54 (sprocket #8), then processor 170 merely provides a shift signal that causes front derailleur 62 to shift chain 58 to the next larger front sprocket 50. For example, if chain 58 originally engages the inner front sprocket 50 as shown in FIG. 5, and if chain 58 is on sprocket #8 while the bicycle is still accelerating, then processor 170 commands front derailleur 62 to move chain 58 to the middle front sprocket 50. Since the bicycle speed most likely will be too slow for that sprocket combination, processor 170 will automatically and sequentially move rear derailleur 66 to larger rear sprockets 54 until the appropriate sprocket combination is achieved for the current bicycle speed. A similar procedure occurs when the bicycle is decelerating and rear derailleur 66 reaches sprocket #1. In this case, front derailleur 62 moves chain 58 from the middle front sprocket 50 to the inner front sprocket 50, and rear derailleur 66 moves chain 58 to smaller rear sprockets 54 until the proper rear sprocket 54 is engaged for the current bicycle speed.

Figure 6:
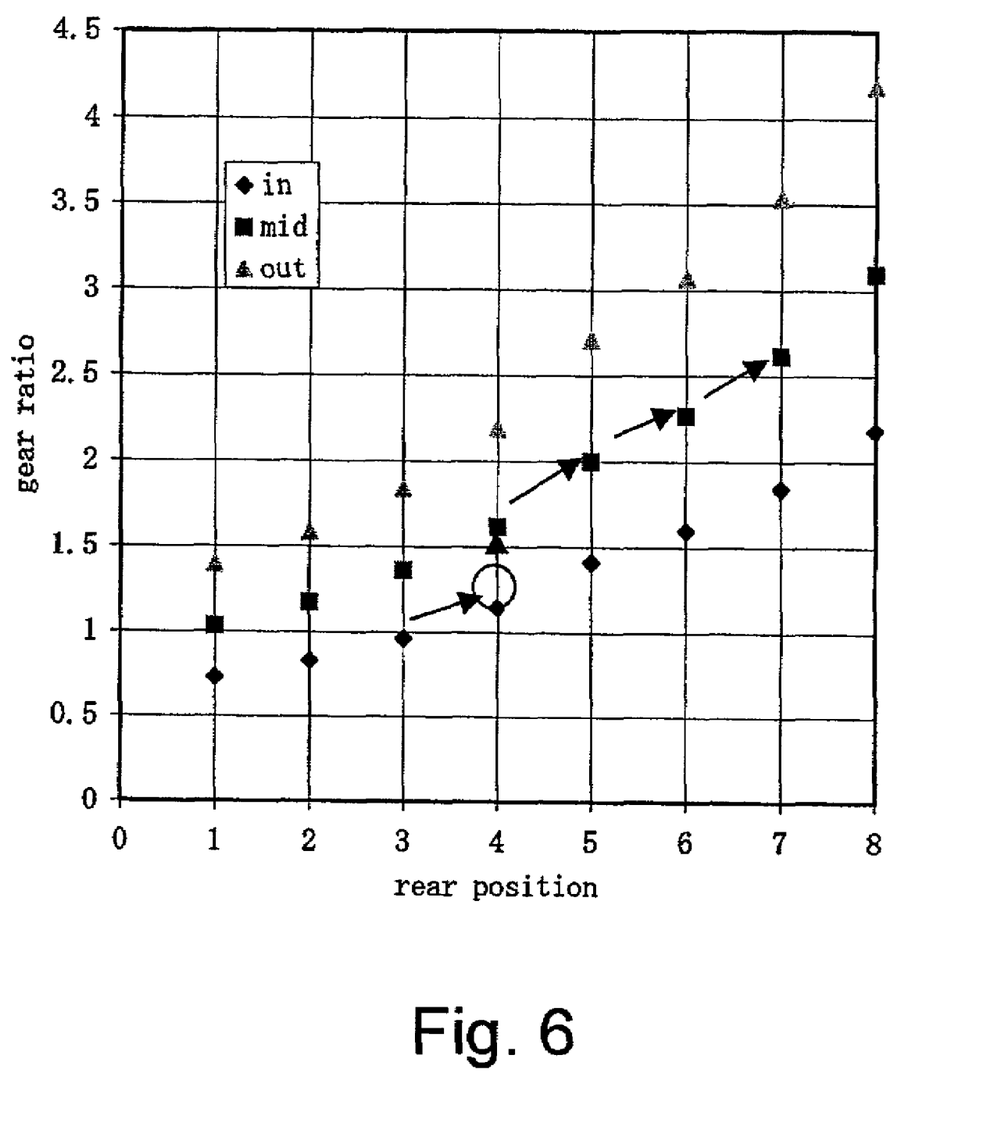
FIG. 6 is a chart illustrating derailleur shifting according to the present invention during rapid acceleration.

If the bicycle is accelerating or decelerating very rapidly, prior art systems which shift sequentially though numerically higher and lower gear ratios would generate much noise and disturbing vibrations as the system tries to shift through all of the required gear ratios to keep up with the rapid acceleration or deceleration. The situation is further aggravated by the fact that many times both the front and rear derailleurs must be moved to shift a single gear step. A system constructed according to the teachings of the present invention avoids such undesirable operation simply by shifting front derailleur 62 to the next larger or smaller front sprocket 50 during rapid acceleration or deceleration. FIG. 6 illustrates the operation of the system in the case of rapid acceleration. As shown in FIG. 6, when rapid acceleration is detected when shifting from rear sprocket #3 to rear sprocket #4, processor 170 causes front derailleur 62 to shift from the inner front sprocket 50 to the middle front sprocket 50, and processing continues in the normal manner. Of course, if rapid acceleration is still detected when chain 58 engages the middle front sprocket 50, then processor 170 would cause front derailleur 62 to shift from the middle front sprocket 50 to the larger front sprocket 50.

To determine whether the bicycle is rapidly accelerating, assume chain 58 currently engages the inner front sprocket 50 an rear sprocket #4. Processor 170 may initially compare the current pulse interval with the pulse interval for shifting from sprocket #5 to sprocket #6 (446 μsec). If the current pulse interval is less than 446 μsec, then processor 170 provides a shift signal for causing front derailleur 62 to shift chain 58 to the middle front sprocket 50. Chain 58 remains engaged with rear sprocket #4. If the current pulse interval is not less than 446 μsec, then processor compares the current pulse interval with the pulse interval for shifting from sprocket #4 to sprocket #5 (506 μsec). If the current pulse interval is less than 506 μsec, then processor 170 provides a shift signal for causing rear derailleur 66 to shift chain 58 from sprocket #4 to sprocket #5, which is the normal operation shown in FIG. 4. If chain 58 currently engages rear sprocket #7, then processor 170 initially compares the current pulse interval with the pulse interval for shifting from sprocket #6 (one sprocket less than the current rear sprocket 54) to sprocket #7 when chain 58 engages the middle front sprocket 50 (273 μsec). If the current pulse interval is less than 273 μsec, then processor 170 provides a shift signal for causing front derailleur 62 to shift chain 58 to the middle front sprocket 50. Chain 58 remains engaged with rear sprocket #7. If chain 58 currently engages rear sprocket #8, then processor 170 initially compares the current pulse interval with the pulse interval for shifting from sprocket #6 (two sprockets less than the current rear sprocket 54) to sprocket #7 when chain 58 engages the middle front sprocket 50 (273 μsec). If the current pulse interval is less than 273 μsec, then processor 170 provides a shift signal for causing front derailleur 62 to shift chain 58 to the middle front sprocket 50. Chain 58 remains engaged with rear sprocket #8. Rapid deceleration is handled in the same albeit reversed manner, in that processor 170 would cause front derailleur 62 to shift from a larger front sprocket 50 to a smaller front sprocket 50.

Sometimes a rider may wish to ride in a gear other than the one selected by the processor. A system constructed according to the present invention can accommodate such a situation by switching to a manual mode of operation whenever the rider presses one of the upshift switches 120 or 136 or one of the downshift switches 124 or 140. In that case the system switches to a manual mode and performs the requested shift. The rider would perform further shifting manually. The rider could switch to the manual mode without an accompanying gear shift by pressing one of the mode switches 116 or 132. If desired, the system could revert back to an automatic mode of operation after a prescribed time interval, or by pressing one of the mode switches 116 or 132 in a prescribed manner.

While the above is a description of various embodiments of the present invention, further modifications may be employed without departing from the spirit and scope of the present invention. For example, memory 182 could store multiple reference values for generating different speed tables for each sprocket. Likewise, memory 182 could store multiple reference values for generating different speed tables depending upon riding conditions, rider characteristics, etc. Such reference values could be selected by pressing the mode switches 116 or 132. Memory 182 also could store one or more shift value adjusting constants, and the shift values may be adjusted by such shift value adjusting constants.

While pulse intervals were used as the shift values, wheel speed values indicating a bicycle speed also could be used as the shift values. In that case the shift values would be calculated using the reciprocals of the tooth ratios noted above, since pulse intervals are inversely related to wheel speed.

The teachings of the present invention also could be applied to a bicycle that shifts primarily among the front sprockets (with or without a corresponding rear derailleur). In this case, shift values for shifting from a smaller diameter front sprocket to a larger diameter front sprocket during increasing bicycle speed would be calculated by multiplying a reference value by the number of teeth on the smaller front sprocket and dividing by the number of teeth on the larger front sprocket. Shift values for shifting from a larger diameter front sprocket to a smaller diameter front sprocket during decreasing bicycle speed would be calculated by multiplying the reference value by the number of teeth on the larger front sprocket and dividing by the number of teeth on the smaller front sprocket.

The size, shape, location or orientation of the various components maybe changed as desired. Components that are shown directly connected or contacting each other may have intermediate structures disposed between them. The functions of one element may be performed by two, and vice versa. The structures and functions of one embodiment may be adopted in another embodiment. The teachings of the present invention may be applied to other types of transmissions. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. An apparatus for determining when to shift a bicycle chain from a first sprocket having a first number of teeth to a second sprocket having a second number of teeth, comprising:
    a memory for storing a reference value; and
    a processor that determines a shift value corresponding to a shift speed for shifting the chain from the first sprocket to the second sprocket by multiplying the reference value by one of the first number of teeth and the second number of teeth and dividing by the other one of the first number of teeth and the second number of teeth.

2. The apparatus according to claim 1 wherein the reference value corresponds to a shift value for shifting the chain from a previous sprocket to the first sprocket.

3. The apparatus according to claim 1 wherein the memory stores a shift value adjusting constant, and wherein the processor adjusts the shift value by the shift value adjusting constant.

4. The apparatus according to claim 1 wherein the second number of teeth is greater than the first number of teeth, and wherein the processor determines the shift value by multiplying the reference value by the first number of teeth and dividing by the second number of teeth.

5. The apparatus according to claim 1 wherein the reference value comprises a rotation time interval corresponding to a wheel rotation rate.

6. The apparatus according to claim 5 wherein the first sprocket corresponds to a first front sprocket, wherein the second sprocket corresponds to a second front sprocket, and wherein the chain shifts from the first sprocket to the second sprocket.

7. The apparatus according to claim 6 wherein the reference value comprises a rotation time interval for shifting the chain from a previous sprocket to the first sprocket.

8. The apparatus according to claim 7 wherein the memory stores a shift value adjusting constant, and wherein the processor adjusts the shift value by the shift value adjusting constant.

9. The apparatus according to claim 4 wherein the reference value comprises a bicycle speed.

10. The apparatus according to claim 4 wherein the first sprocket corresponds to a first rear sprocket, wherein the second sprocket corresponds to a second rear sprocket, and wherein the chain shifts from the first sprocket to the second sprocket.

11. The apparatus according to claim 10 wherein the reference value comprises a bicycle speed for shifting the chain from a previous sprocket to the first sprocket.

12. The apparatus according to claim 11 wherein the memory stores a shift value adjusting constant, and wherein the processor adjusts the shift value by the shift value adjusting constant.

13. The apparatus according to claim 1 wherein the first number of teeth is greater than the second number of teeth, and wherein the processor determines the shift value by multiplying the reference value by the first number of teeth and dividing by the second number of teeth.

14. The apparatus according to claim 13 wherein the reference value comprises a rotation time interval corresponding to a wheel rotation rate.

15. The apparatus according to claim 14 wherein the first sprocket corresponds to a first front sprocket, wherein the second sprocket corresponds to a second front sprocket, and wherein the chain shifts from the first sprocket to the second sprocket.

16. The apparatus according to claim 15 wherein the reference value comprises a rotation time interval for shifting the chain from a previous sprocket to the first sprocket.

17. The apparatus according to claim 16 wherein the memory stores a shift value adjusting constant, and wherein the processor adjusts the shift value by the shift value adjusting constant.

18. The apparatus according to claim 13 wherein the reference value comprises a bicycle speed.

19. The apparatus according to claim 18 wherein the first sprocket corresponds to a first rear sprocket, wherein the second sprocket corresponds to a second rear sprocket, and wherein the chain shifts from the first sprocket to the second sprocket.

20. The apparatus according to claim 19 wherein the reference value comprises a bicycle speed for shifting the chain from a previous sprocket to the first sprocket.

21. The apparatus according to claim 20 wherein the memory stores a shift value adjusting constant, and wherein the processor adjusts the shift value by the shift value adjusting constant.

22. An apparatus for determining when to shift a bicycle chain among a plurality of sprockets, comprising:
    a wheel rotation sensor;
    a memory for storing a table having a plurality of shift values corresponding to shift speeds, wherein a shift value $SV(m)$ for shifting from a sprocket $S(m)$ having $T(m)$ teeth to a sprocket $S(n)$ having $T(n)$ teeth equals a reference value $RV(m)$ multiplied by one of $T(m)$ and $T(n)$ and divided by the other one of $T(m)$ and $T(n)$; and
    a processor for providing a shift signal when the bicycle chain engages sprocket $S(m)$ and a value calculated from the wheel rotation sensor passes shift value $SV(m)$.

23. The apparatus according to claim 22 wherein the reference value RV(m) corresponds to a shift value SV(p) for shifting the chain from a previous sprocket S(p) to sprocket S(m).

24. The apparatus according to claim 22 wherein the memory stores a shift value adjusting constant, and wherein the processor adjusts the shift value SV(m) by the shift value adjusting constant.

25. The apparatus according to claim 22 wherein T(n) is greater than T(m), and wherein the shift value SV(m) for shifting from the sprocket S(m) to the sprocket S(n) equals the reference value RV(m) multiplied by T(m) and divided by T(n).

26. The apparatus according to claim 25 wherein the reference value RV(m) comprises a rotation time interval that indicates a wheel rotation rate.

27. The apparatus according to claim 26 wherein the sprocket S(m) corresponds to a first front sprocket, wherein the second sprocket S(n) corresponds to a second front sprocket, and wherein the chain shifts from the sprocket S(m) to the sprocket S(n).

28. The apparatus according to claim 27 wherein the reference value RV(m) corresponds to a shift value SV(p) for shifting the chain from a previous sprocket S(p) to sprocket S(m).

29. The apparatus according to claim 28 wherein the memory stores a shift value adjusting constant, and wherein the processor adjusts the shift value SV(m) by the shift value adjusting constant.

30. The apparatus according to claim 25 wherein the reference value RV(m) comprises a bicycle speed.

31. The apparatus according to claim 30 wherein the sprocket S(m) corresponds to a first rear sprocket, wherein the second sprocket S(n) corresponds to a second rear sprocket, and wherein the chain shifts from the sprocket S(m) to the sprocket S(n).

32. The apparatus according to claim 31 wherein the reference value RV(m) corresponds to a shift value SV(p) for shifting the chain from a previous sprocket S(p) to sprocket S(m).

33. The apparatus according to claim 32 wherein the memory stores a shift value adjusting constant, and wherein the processor adjusts the shift value SV(m) by the shift value adjusting constant.

34. The apparatus according to claim 22 wherein T(m) is greater than T(n), and wherein the shift value SV(m) for shifting from the sprocket S(m) to the sprocket S(n) equals the reference value RV(m) multiplied by T(m) and divided by T(n).

35. The apparatus according to claim 34 wherein the reference value RV(m) comprises a rotation time interval that indicates a wheel rotation rate.

36. The apparatus according to claim 35 wherein the sprocket S(m) corresponds to a first front sprocket, wherein the second sprocket S(n) corresponds to a second front sprocket, and wherein the chain shifts from the sprocket S(m) to the sprocket S(n).

37. The apparatus according to claim 36 wherein the reference value RV(m) corresponds to a shift value SV(p) for shifting the chain from a previous sprocket S(p) to sprocket S(m).

38. The apparatus according to claim 37 wherein the memory stores a shift value adjusting constant, and wherein the processor adjusts the shift value SV(m) by the shift value adjusting constant.

39. The apparatus according to claim 34 wherein the reference value RV(m) comprises a bicycle speed.

40. The apparatus according to claim 39 wherein the sprocket S(m) corresponds to a first rear sprocket, wherein the second sprocket S(n) corresponds to a second rear sprocket, and wherein the chain shifts from the sprocket S(m) to the sprocket S(n).

41. The apparatus according to claim 40 wherein the reference value RV(m) corresponds to a shift value SV(p) for shifting the chain from a previous sprocket S(p) to sprocket S(m).

42. The apparatus according to claim 41 wherein the memory stores a shift value adjusting constant, and wherein the processor adjusts the shift value SV(m) by the shift value adjusting constant.

* * * * *